May 18, 1965            F. M. DARNER            3,183,695
APPARATUS AND PROCESS FOR PRODUCING PERFORATED,
CORRUGATED, SPIRAL, LOCK-SEAM PIPE
Filed July 31, 1961            5 Sheets-Sheet 1

INVENTOR.
FREDERIC M. DARNER
BY
HIS ATTORNEY

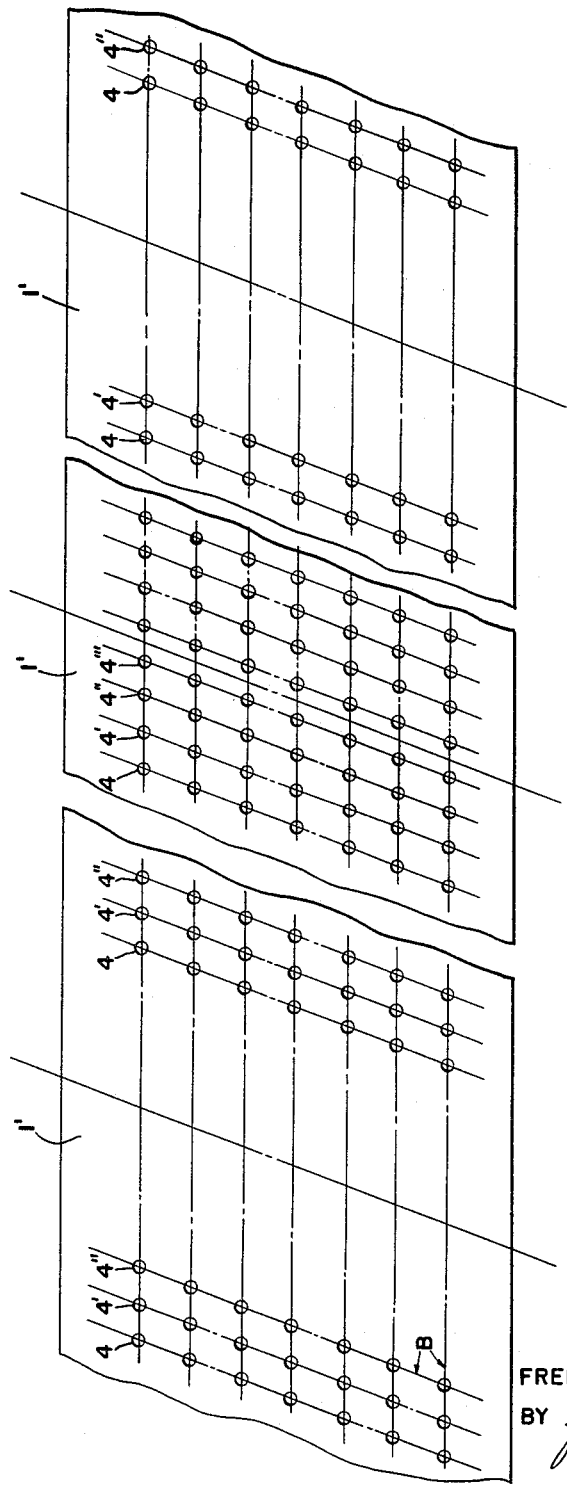

May 18, 1965  F. M. DARNER  3,183,695
APPARATUS AND PROCESS FOR PRODUCING PERFORATED,
CORRUGATED, SPIRAL, LOCK-SEAM PIPE
Filed July 31, 1961  5 Sheets-Sheet 3

INVENTOR.
FREDERIC M. DARNER
BY
HIS ATTORNEY

May 18, 1965 F. M. DARNER 3,183,695
APPARATUS AND PROCESS FOR PRODUCING PERFORATED,
CORRUGATED, SPIRAL, LOCK-SEAM PIPE
Filed July 31, 1961 5 Sheets-Sheet 4

INVENTOR.
FREDERIC M. DARNER
BY
HIS ATTORNEY

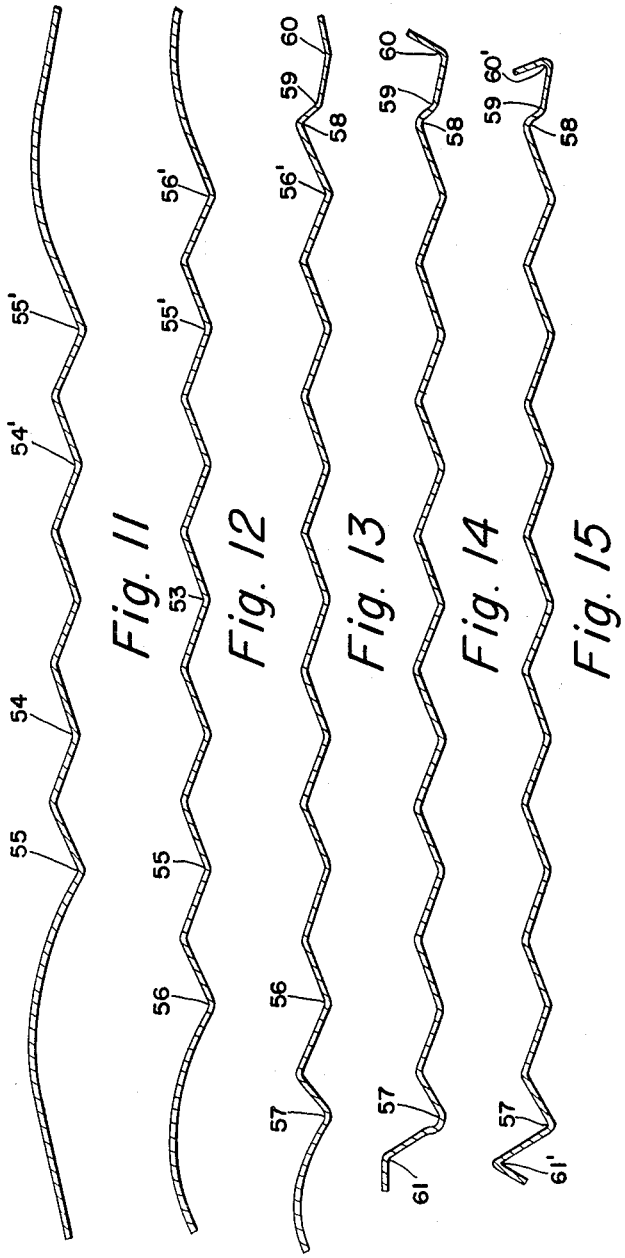
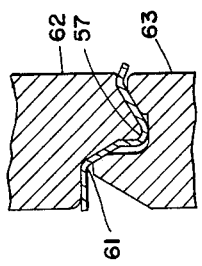

United States Patent Office 3,183,695
Patented May 18, 1965

3,183,695
APPARATUS AND PROCESS FOR PRODUCING PERFORATED, CORRUGATED, SPIRAL, LOCK-SEAM PIPE
Frederic M. Darner, Shaker Heights, Ohio, assignor to Republic Steel Corporation, Cleveland, Ohio, a corporation of New Jersey
Filed July 31, 1961, Ser. No. 128,082
10 Claims. (Cl. 72—49)

This invention relates to apparatus and process for producing by a continuous operation corrugated spiral lock-seamed pipe having perforations in a desired area of the pipe. More specifically, it relates to the production of such pipe having perforations in a limited area on one side of such pipe.

For many purposes such as draining and irrigation, it is desirable to have corrugated spiral-formed pipe with openings or perforations in a certain region of the pipe so that water can enter or leave the pipe through such perforations. It is generally desirable to have these perforations at the bottom thereby allowing the water to enter at the lowest level. The water can then drain through the open pipe to a lower level. In some cases, the perforated pipe will lead to pipe having no such perforations and thereby be conducted away from the drainage area. In other cases, it may be desirable to use such pipes for irrigation purposes by feeding water to a system of such perforated pipe and thereby allowing the water to leave the pipe through such perforations and pass into the soil.

In either case, it is desirable to have the perforations in a straight line or in a series of parallel straight lines running the length of the pipe. This makes it possible to have all the openings at the bottom of the pipe as it is laid in the ground or at whatever particular side or top position is desirable for such purpose. If these openings are not in straight lines it is impossible to lay the pipe with all the openings through the length of the pipe in the desired position.

While spiral lock-seam corrugated pipe having perforations in a limited area thereof has been produced, the production thereof has involved a number of operations which require considerable amount of handling of the pipe in drilling holes after the pipe has been formed and cut to desired lengths. Moreover, the maintenance cost in sharpening and replacing worn-out drills is a very considerable amount.

In addition to this substantial maintenance cost and the undesirable amount of handling which is occasioned by the necessity to drill these holes or perforations after the pipe is formed, the drilling operation results in the formation of burrs on the inside edge of the perforations. These burrs are most disadvantageous since the jagged edges cause a deposition of debris and dirt as they are swept along by water flowing through the pipe. This accumulation of debris and dirt at the bottom of the pipe eventually causes the openings to be clogged and thereby defeats the purpose of the perforations. Since these burrs are on the inside of the pipe, it is practically impossible to file them off or otherwise remove them. In any case, such removal requires an extra operation which involves an additional expense in the manufacture of the pipe.

While a punching of such perforations avoids the burrs produced as described above, such a punching operation for producing the perforations must necessarily be performed before the corrugations and spiral-wrapping steps are performed. If such a punching were performed before the pipe is formed this would require a very accurate design and positioning of the perforations upon the sheet to assure that the resultant pipe will have these perforations in one or more straight lines parallel to the axis of the pipe. Otherwise, as pointed out above, it would be impossible to have the pipe laid with all of the openings in the desired position to perform the drainage or irrigation as described above.

Such a prepunching of the strip or sheet to give the desired hole or perforation pattern requires not only that the punching be very accurately designed and performed, but also requires that the corrugating and spiral-wrapping operations are performed accurately. Once the holes are punched in the sheet, any variation in accuracy in the corrugating and spiral-wrapping operations will cause variations in the location of these holes or perforations in the ultimate pipe. In such cases, the perforations will not be in straight lines as desired, but will vary from such straight lines according to the degree of inaccuracy produced.

Since the pipe is corrugated, it is desirable to have these openings appear in a consistent location with respect to the crests and valleys of the corrugations. It is generally preferred that these corrugations are positioned in the valleys of the corrugations, that is with respect to the outside of the pipe. In this way the crests of the corrugations will rest on the ground or supporting means under the pipe and will leave the valleys open so that water can flow into and out of the valleys and thereby into and out of the perforations. If the openings are located in the crests of the corrugations, the openings would be pressed against the supporting means and would be covered or plugged thereby. For this reason also, it is necessary to have the position of the perforations or holes accurately designed and stamped or punched, and also to have the corrugating operation accurately performed so as to have these openings positioned in the valleys, or in the crests if so desired.

Obviously, a pattern of openings or perforations designed for one diameter of pipe, in such a manner so as to produce the perforations in the desired location in the resultant pipe, is not suitable for pipe of other diameters. Therefore, each particular diameter requires a specific design and positioning of openings to give the perforations in the desired location with respect to the straight lines and to the valleys or crests of the corrugations as described above. This means that each different diameter of pipe requires a different pattern of openings to be prepunched in the metal sheet to be used for the production of such pipe. In turn this means that if the perforations or openings are to be prepunched and the resultant coils stored for subsequent use, there must be a variety of patterns prepunched in accordance with the variety of diameters to be produced. Therefore, in addition to the extra handling and prepunching operation, there is the problem of storing and sorting the various coils of prepunched sheet metal.

These difficulties of such prepunching operation is evidenced by the fact that the perforated corrugated spiral-wrapped pipe commercially available prior to the present invention, and even presently available commercially except by practice of this invention, is of the subsequently drilled type having the undesirable burrs described above.

In applicant's early attempts to avoid the disadvantages of prepunching and storing coils of various designs, as described above, by performing the perforations in a continuous manner and integrated as one of the steps of a continuous process for producing such pipe, the various above-described difficulties of performing the corrugating and spiral-wrapping steps on prepunched sheet with sufficient accuracy to have the perforations appear in the desired locations, was further complicated by insertion of the additional steps of punching which must still be performed with as much accuracy as previously described for the separate prepunching.

Here again, the difficulties of such continuous operation also are confirmed by the fact that, except for pipe produced by applicant's invention, the only commercial perforated pipe of this type now available has the aforementioned burrs which prove that the perforations had been drilled into the pipe after the pipe had been formed.

In accordance with this invention, it has now been found that corrugated, spiral-formed, lock-seamed pipe with perforations accurately positioned in the desired area of the pipe, can be produced by a continuous sequence of steps involving the unwinding of a coil of sheet metal, passing the sheet metal or strip through pinch rolls and flattening rolls to move the strip forward at a controlled rate, thereafter allowing the strip to periodically form a loop before it passes through a punch press which periodically punches holes of a predesigned pattern in the sheet as it passes through the press, the section being punched being stopped momentarily during the operation of the press whereas there is continuous unwinding of the reel and continuous constant rate passage through the subsequent corrugating and spiral-wrapping equipment, and thereafter passing through a looping region where sufficient sheet is looped to provide for continuous constant rate movement through a corrugating machine wherein the sheet is corrugated, thereafter bending the linear edges of the sheet to provide the overlapping for the ultimate lock-seam, thereafter passing the corrugated sheet over a mandrel or inner supporting rolls to effect a spiral wrap and simultaneously fitting and locking a lock-seam. The resulting pipe is rotating and, where the pipe is to be cut into desired lengths, a travelling saw is locked onto the formed pipe and the finished pipe cut to appropriate lengths.

By the practice of this invention, it has been found possible to produce the perforated, corrugated, spiral-wrapped, lock-seam pipe in a continuous manner with the perforations accurately positioned in straight lines running parallel to the axis of the pipe without having to stop the unreeling, corrugating, edge-forming, spiral-wrapping and lock-seaming operations in order to temporarily bring the sheet or strip to a stop for the punching operations. The travel of the strip is stopped only at the completion of the unwinding of each reel of sheet metal, when the end of the sheet is brought to a stop and the beginning edge of the next strip brought to abutting relationship and these ends of the two strips welded together so as to provide a continuous strip. This can be done manually but it is preferred to have the strip pass through a shear welder located just before the punch press. In such case, the first loop of the strip can be effected before or after passage of the strip through the shear welder.

By adjusting the diameter of the mandrel upon which the perforated, corrugated strip is spirally wrapped and also adjusting the angle at which the mandrel is positioned with respect to the path of the strip in its travel through the corrugating equipment, it is possible to produce different diameters of pipe. By adjusting accordingly the pattern and angle of openings punched in the sheet or strip as it travels through the punch press, it is possible to have the openings in one or more straight lines running parallel to the axis of the pipe, regardless of the diameter of the pipe produced.

In the drawings:

FIG. 3 shows a section of the sheet metal in which openings have been punched in a pattern suitable for producing pipe with perforations in three straight lines parallel to the axis of the pipe upon corrugation and spiral-wrapping as described herein.

FIG. 4 shows another pattern of openings punched in a section of sheet metal for similar pipe with four rows of perforation.

FIG. 5 shows another pattern of openings punched in a section of sheet metal for similar pipe with two rows of perforations.

FIGS. 9–15 show various transverse cross-sectional views of the strip in sequence as it passes through the various corrugating rolls and edge-forming rolls.

FIGS. 16 and 17 show cross-sections of edge-forming rolls and the bent edges of the strip as shaped by these rolls.

Figure 1:
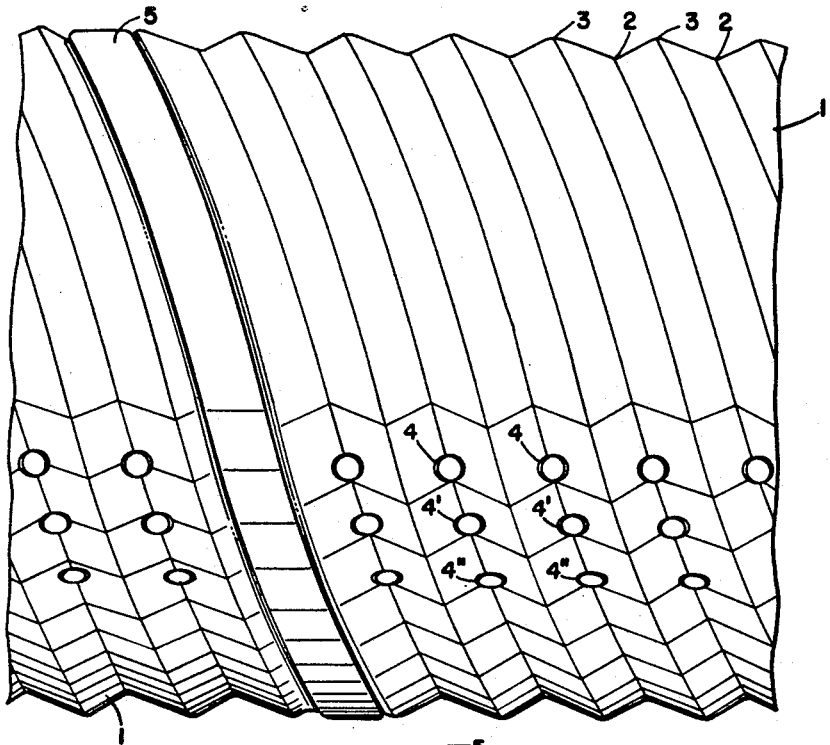
FIG. 1 illustrates an outside view of a perforated, corrugated, spiral-wrapped, lock-seamed pipe produced according to this invention, with perforations arranged in three straight lines running parallel to the axis of the pipe.

In producing perforated pipe according to this invention, a coil of sheet metal or strip is placed on an unwinding device suitable for supporting the coil and controlling the unwinding. While various sizes of coils and widths of sheet can be used in the practice of this invention, it has been found particularly suitable to use coils having a maximum weight of 10,000 pounds, a maximum width of 24 inches, a maximum outside diameter of 60 inches, a minimum inside diameter of 20 inches and a maximum inside diameter of 24 inches. It is also advantageous to use a supporting mandrel having an arm expansion of 18 inches to 24 inches. Various supporting reels and mandrels are known and are commercially available for such purpose.

The strip or sheet unwinding from this coil runs through a set of "first pinch rolls" and, where desired, flattening or straightening rolls. The pinch rolls effect a controlled rate of feed of the sheet coming from the unwinding reel. This feed rate is advantageously maintained in the range of about 50–150 feet per minute, depending on the rate maintained in the subsequent corrugating equipment. The pinch rolls are driven and provide the driving force to the sheet passing through the pinch rolls. There are advantageously 2 pairs of first pinch rolls, one pair before and the other after the flattening rolls. The pinch rolls are suitably positioned so that the sheet passes between the two members of each pair and is thereby given the desired driving force.

A limit switch is fixed to one of the pinch rolls. When a sheet is between this pinch roll and the other pinch roll paired therewith the switch is inactive. However, when there is no sheet to force the two pinch rolls apart from each other, the limit switch actuates a control to shut off the subsequent equipment.

The flattening or straightening rolls remove any contours or unevenness in the sheet and thereby insure a substantially flat sheet. While various arrangements and numbers of pinch rolls and flattening rolls can be used, it has been found particularly suitable to use seven flattening rolls, four below and three above the sheet passing between these rolls and one pair of pinch rolls just before and another pair of pinch rolls just after the flattening rolls.

At the exit side of the flattening and strip driving machine, there is attached a loop control having an arm extending in the direction toward which the sheet is passing and supporting a roller, or "first looping roll," which rests upon the sheet after it has left the flattening machine.

This control arm is pivoted at the point of attachment to the flattening machine in such a manner that the roller supported at the opposite end of the loop control arm, can rise or fall in accordance with the position of the sheet with which it is in contact. This roller is adapted to rotate so that there will be a minimum of friction between the roller and the sheet passing under it.

This roller rests on the strip passing under it in such a manner that when the sheet is stopped for an instant at a more advanced position for the punching operation, the passage of the sheet through the pinch and flattening rolls is continued at a controlled rate of feed and the accumulated length of sheet between the straightening machine and the punching equipment is looped downward by the weight of the roller or first looping roll. As driving rolls in the punching equipment advance the sheet so that it is passed therethrough, tension is applied to the sheet so that the size of the first loop in the sheet metal, which is just past the straightening machine, is decreased and the looping roll is swung upward and supported by the sheet passing under it.

This first loop control is equipped with a control which regulates the speed of the "first pinch rolls" according to the position of the control arm. As the accumulated sheet forms a longer and lower loop the control automatically decreases the speed of the first pinch rolls. As the size of the loop decreases this control automatically increases the speed of these first pinch rolls to increase the feed rate of the sheet.

When the loop control arm falls below a prescribed point, it actuates a shut-off switch for the "first pinch rolls." This shut-off switch guards against any breakdown in the punching operation which retards the movement of the sheet through the punching equipment. When the loop rises again and moves the loop control arm to another prescribed point, it can actuate an "on" switch for these pinch rolls.

This combination of looping and corresponding regulation of the rate of feeding the sheet by increasing and decreasing the speed of the first pinch rolls according to the size of this first loop permits the use of a relatively small looping space. If desired and where a much deeper looping space can be provided, it is possible to omit the regulating speed control for these pinch rolls. In such case only the "shut-off" and "on" switch controls need to be provided.

It is also desirable to provide a control switch to shut off the subsequent equipment in case there is a breakdown in these first pinch rolls. This can be actuated by a prescribed high position of the control arm when the loop disappears and the sheet is under tension from the driving rolls in the punching equipment.

When the sheet is completely unwound from the unwinding coil and the end of the sheet passes through the aforesaid pinch roll which has affixed to it the limit switch, this limit switch actuates a stopping mechanism which temporarily stops the entire operation to permit a new coil to be placed on the unwinding device and the edge of the new sheet brought in to abutting relationship with the end of the first sheet. These abutting edges are then welded together so that the sheets from the first and second rolls are made continuous. Thus continuous operation can be renewed through the length of sheet on the second roll after which the operation is similarly repeated.

The manner of performing this welding of the end of the old reel to the beginning of the new reel is not critical and can be performed in any suitable manner. Actually the operation can be performed at any point between the pinch roll which has the limit switch attached thereto and the punching equipment. However, this welding operation is advantageously performed between the loop control and the punching equipment. It has been found desirable to have the sheet pass through a shear welder just prior to entering the punching equipment. This permits the end of the first sheet to be drawn onto the table of the shear welder and fastened into position while the beginning of the next sheet is advanced through the pinch rolls and flattening rolls and loop control and then laid on the table of the shear welder. The two edges can then be sheared to assure their being square to the linear edges and then brought to abutting relationship with each other. The two edges are held in close contact while the welding operation is performed. Then the continuous operation is renewed.

After the sheet has passed through the first loop and through the shear welder, if such is used, it is passed through a pair of driving rolls on the entrance side of the punching equipment, then into the punching area of the punching equipment, and then through a second set of driving rolls.

Pressure is maintained on the driving rolls at the entrance and exit of the punching equipment so that the two rolls in each pair are pressed against each other by springs, or by hydraulic or other satisfactory means, to aid in transmitting to the sheet passing through the punching equipment the desired rate of speed and to instantaneously stop the sheet periodically for the punching operation. The equipment is set so that after the driving rolls have revolved the proper circumferential distance to advance the sheet the proper distance through the punching equipment, the driving rolls are stopped instantaneously, thereby also stopping the sheet, and actuating the punching operation.

As the punches subsequently move upward away from the sheet, the driving rolls are actuated to advance the sheet again through the desired distance. This sequence is repeated continuously. The speed of the driving rolls and consequently the rate of moving of the sheets between punching operations is advantageously about 150–200 feet per minute and with the punching equipment performing 15–30 punching strokes per minute.

It is found advantageous to use a rate of approximately 100 feet per minute of the sheet passing through the corrugating equipment with a corresponding overall or effective rate through the "first pinch rolls." This means that the speed of the sheet passing through the punching equipment is approximately 180 feet per minute during the actual movement periods. The faster speed compensates for the time when the sheet is stopped during the actual punching operation.

Punching equipment of the type described is commercially available. A particularly suitable punch press is one having a capacity of approximately 200 tons and capable of 15–30 punch strokes per minute.

As previously indicated, the pattern and spacing of openings which are punched into the sheet are designed in accordance with the diameter of the pipe, the depth of the corrugations, the width of the sheet being used, and the number and spacing of the perforations desired in the ultimate pipe. Each variation on any one of these factors requires a corresponding change in the spacing arrangement of the perforations to be punched in the sheet. These perforations are punched in a pattern in which the centers of the openings are on a straight line and at a particular appropriate angle to the linear edge of the sheet. Then as these patterns must be appropriately aligned in straight lines and in the valleys or crests of the corrugations, the center line of each pattern must be appropriately spaced from the center line of the next pattern of perforations. For example for pipe of 24 inch diameter, the distance between centers for succeeding patterns is 79.061 inches.

After the punched sheet emerges from the punch press and through the driving rolls on the advance side of the punch press, the sheet passes under a "second loop control" somewhat similar to the "first loop control," and then through a second set of pinch rolls ("second pinch rolls") which advance the sheet through the subsequent corrugating equipment.

This second loop control is adapted to loop the sheet as it is fed from the punching equipment. However, when the sheet is stopped in the punch press for the punching operation, the second pinch rolls, e.g. those which advance the sheet into the corrugating equipment, put the sheet in the second looping area under tension in such a manner as to raise the roller of the loop control. This loop control is equipped with a limit switch which is actuated when the tension on the sheet raises the loop control arm above a predetermined point. This limit switch then actuates a control means which stops the corrugating and other equipment. This control means actuated by the loop control limit switch is a safeguard in case the progress of the sheet is stopped in the punching equipment more than a prescribed amount.

The various control, actuating and regulating devices used in these various pieces of equipment are of standard types and are commercially available.

The second pinch rolls are driven at a constant rate so as to move the sheet through the corrugating machine at a constant rate. However, in order to effect this and to compensate for the period during which the sheet is stopped in the punching operation, the rate at which the sheet is actually moving through the punching operation is increased over that of the sheet passing through the corrugating pinch rolls. However, the overall speed through the punching equipment, that is the total time the sheet is in motion and the time at rest while in the punching equipment, is equal to the speed through the corrugating machine.

The corrugating machine can be the standard type of corrugating equipment used for producing corrugations for spirally-wrapped pipe without perforations. However, the positioning of the corrugations must be accurately controlled so as to coincide properly with the accurately positioned perforations so that the latter appear in the valleys or crests as designed.

This corrugating equipment comprises a series of pairs of rolls having a protruding section which fits into a corresponding recessed portion of the other roll of that pair, the contour of the protruding section and the recessed section corresponding to the corrugations that will be produced in the strip being passed between the rolls. The first pair of rolls through which the strip passes produces a single corrugation or groove at the middle of the strip. The second pair of rolls produces a corrugation on each side of this first corrugation so that the strip as it passes through the second pair of rolls has three corrugations pressed therein. The third pair of rolls adds another corrugation on each side of the previously pressed corrugations so that the strip as it passes between this third pair of rolls has five corrugations pressed therein. In passing through the fourth pair of corrugating rolls, an additional corrugation is similarly pressed on each side of the corrugations previously pressed in the strip.

This is continued with a pair of corrugations being added each time the strip passes through each additional pair of corrugating rolls. The number of such corrugating rolls depends on the number of corrugations to be pressed.

When the strip is passed through one of the final sets of corrugating rolls an initial turn or bend is given to the linear edges of the strip. One of the edges of the strip is turned upward and the opposite edge is turned down. When the strip passes through the last corrugating roll, these same turns are further accentuated in the same directions so as to give the desired bend or turn to the linear edge which eventually will form the spiral lock seam, when the strip is eventually spiral-wrapped to form the pipe. This turning or bending of the linear edges is effected by a pair of rolls at each side of the corrugating rolls which have outer contours shaped to give the desired turn or bending to the edge of the sheet. One of the rolls has a protrusion which fits into a recessed section of the other rolls in such a manner that as the edge of the sheet passes between these rolls the desired bending is effected. Instead of having this bending effected by one such set of rolls this bending is performed in two steps by having an initial turning effected with the passage of the sheet through one of the last corrugating rolls and an additional bending effected by a subsequent pair of rolls.

Immediately after the sheet is passed through the last pair of corrugating rolls, it is fed by a feeding roll over a confining or supporting roll into the spiralling head of the spiral wrapping equipment. This operates in a manner similar to that presently used for making non-perforated spiral, corrugated, lock-seam pipe. The diameter of the mandrel and the angle at which the strip is turned with respect to the direction in which the strip passes through the corrugating equipment determines the diameter of the resultant pipe.

For example, in producing six inch pipe this diameter is 50° 18′; a pipe of 8 inches diameter requires a corresponding angle of 62° 55′; and the production of a 10 inch pipe requires a corresponding angle of 68° 26′. Various other diameters require similar adjustments in this angle, with the larger diameters requiring correspondingly larger angles and smaller diameters requiring correspondingly smaller angles.

The sheet is spirally wrapped on the mandrel and held in tight position thereon by shoes or rolls which have grooves corresponding in direction to those of the corrugated sheet. At the same time rollers are pressed against the turned over edges of the strip as they are brought into interlocking relationship upon formation of the spiral and the bending of the edges to complete the lock seam is thereby effected.

The completely formed pipe is thereafter advanced over rollers or by conveyor to a position where a travelling saw of standard type can be locked into position onto the pipe and the pipe sawed into desired lengths.

The invention is best illustrated by reference to the accompanying drawings.

FIG. 1 shows a side view of the pipe formed from strip or sheet 1 in the final corrugated, spirally-wrapped form with the corrugations shown having valleys 2 and crests 3. The perforations 4, 4′ and 4″ are shown in three rows respectively, the centers in each row being in a straight line parallel to the axis of the pipe. For example, the center line of openings 4′, as well as the center line of openings 4″ are also in lines parallel to the axis of the pipe. The lock seam 5 is shown in its outer spiral shape in FIG. 1 and in FIG. 2 is shown in a cross section.

Figure 2:
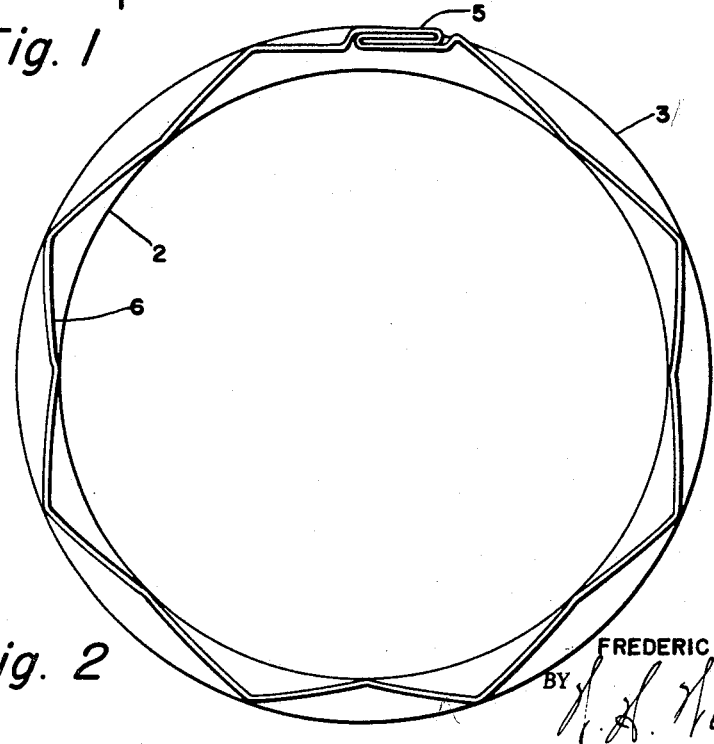
FIG. 2 shows an end view of the pipe shown in FIG. 1.

FIG. 2 shows an end view of the pipe taken at a line A—A of FIG. 1. The inner diameter and outer diameter of the pipe correspond generally to the crest 3 and valleys 2 of the corrugations as shown in FIG. 2. In cross-section, the cut sheet or strip that forms the pipe has a general octagonal configuration of sides 6.

FIG. 3 illustrates a typical pattern of perforations which are punched in strip 1′ shown in broken section. The center line through each row of openings has an angle B with a linear edge of the sheet. In this particular pattern of 42 holes this angle B is 69° 31′ 58.8″. This pattern is designed to give three rows of openings 4, 4′ and 4″ after the strip is corrugated and spirally-wrapped. In the ultimate spirally-wrapped pipe, the three rows of openings 4, 4′ and 4″ shown at the left of FIG. 3 will be aligned with the three rows of openings 4, 4′ and 4″ shown at the right-hand side of FIG. 3.

FIG. 4 shows a pattern of openings 4, 4′, 4″ and 4‴ with 56 such openings.

FIG. 5 illustrates a similar pattern of 28 holes which eventually will be used to form a pipe having two rows of holes aligned in straight lines parallel to the axis of the pipe.

Figure 6:
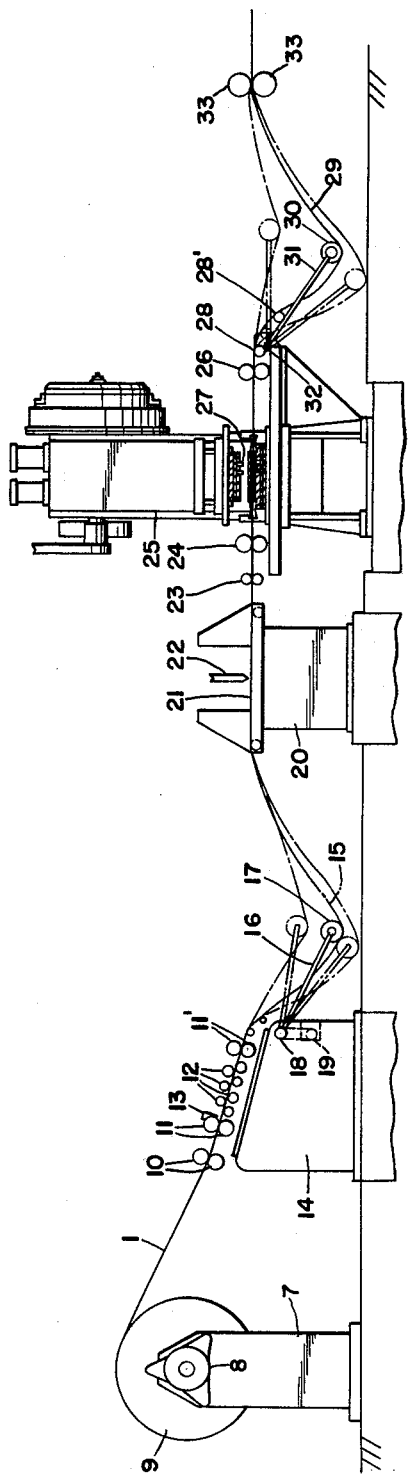
FIG. 6 shows a side view of a section of the system of equipment of this invention involving the reel unwinding operation, the pinch rolls and flattening rolls, first looping operation, a shear welder, the punching equipment, the second looping operation and pinch rolls before the sheet enters the corrugating equipment.

FIG. 6 shows a preferred embodiment of an arrangement of equipment used in the practice of this invention. Supporting means 7 has a reel 8 thereon on which coil 9 is rotatably mounted and from which metal strip 1 is unwound and passed through idler rolls 10 and then through pinch rolls 11, through flattening rolls 12 and through pinch 11'. The set of pinch rolls 11 and 11' are the "first pinch rolls" above referred to. One of the pinch rolls 11 has a limit control switch 13 attached thereto which is actuated when the strip is completely unwound and the end of the strip passes between this pair of pinch rolls. When the end of the strip has passed through these pinch rolls, the control actuates a switch to turn off the subsequent equipment so that a succeeding coil can be put into position as described herein or other arrangements can be effected. Support 14 is a supporting means for the various pinch and flattening rolls described above which are shown without any direct supporting means. This is shown without the housing which generally covers these rolls.

The looped area 15 of the strip passes under loop control arm 16 with roller 17 resting on the strip. This control arm is pivotally attached to the support means for the pinch and flattening rolls. This pivot end 18 is connected to a control means 19 which regulates the driving speed of pinch rolls 11 and 11' according to the position of the loop control arm. The looped section 15 of the strip as well as the loop control arm 16 and roller 17 are shown in dotted section in two other positions to show variations in these positions when the loop is higher or lower.

These variations in the position of the loop and in the resultant changing positions of the loop control arm are calibrated so as to regulate the speed of the pinch rolls 11 and 11' and thereby speed up or slow down the feed rate of the strip. When the strip in the looping area rises above a certain prescribed point, this means that there is some drag in the feeding area, either in the unwinding coil or in the flattening or first pinch rolls and the control 19 actuates a switch to shut off the subsequent equipment. When the loop section falls below a prescribed point, very likely because the subsequent equipment has stopped for some reason, the control 19 actuates a switch to stop pinch rolls 11 and 11' to stop feeding the strip.

As described above, where looping space is available and it is desired to operate in such a manner, this first looping area can be adapted to provide a very deep loop up to a point where the feed rate can be constant and equivalent to the rate going through the subsequent corrugating equipment. However, it is preferred to have an arrangement wherein the different positions of the loop control arm serve to slow down or speed up the feeding equipment. This preferred arrangement requires a relatively small loop area.

The strip is next passed through shear-welder 20 so that the strip resting on table 21 can be sheared at the end of one strip and at the beginning of the next strip by shear blade 22. These two edges are then brought into abutting relationship and welded. The welding equipment is not shown. Then the strip is passed through guide rolls 23 and driving rolls 24 on the entrance side of punch press 25. Driving rolls 26 are shown on the exit side of the punching equipment. Upon the desired number of revolutions of the driving rolls 24 and 26 to give the passage of the desired length of strip through the punching equipment, the punch is actuated so that punches 27 perforate the strip according to the desired pattern of punches set in the equipment. Details of the punching equipment are not shown but are of standard type as described above.

After leaving the punching equipment, the strip passes over guide rolls 28 and 28' into the second looping area. Loop control roll 30 rests on the strip and is supported by loop control arm 31 which is attached at pivot point 32 to the exit side of the punching equipment.

Here again, the loop section 29 of the strip as well as the loop control roller 30 and loop control arm 31 are also shown in dotted section in raised and lowered positions which indicate various positions these have during the operation of this equipment. The loop control arm actuates control which regulate the speed of rolls 24 and 26. As the loop control arm is moved to a higher position due to the supporting strip assuming a more horizontal position, the controls are actuated by this loop control arm to increase the speed of the driving rolls 24 and 26 to speed up the operation of the punching equipment and the resultant passage of the strip therethrough. As the loop control arm moves to a lower position due to the lowering of the supporting strip assuming a larger loop position, the controls are actuated to decrease the speed of driving rolls 24 and 26 and the resultant passage of the strip through the punching equipment.

When the loop falls below a prescribed point, this means that there is a stoppage in the corrugating equipment and the low position of the loop control arm actuates a switch to stop the feed of the strip to and from the punching equipment. When the position of the strip in this second loop rises above a prescribed point, the corresponding position of the loop control arm actuates a switch to turn off the corrugating and other subsequent equipment. This latter condition arises when there is a stoppage in the feed of the strip through the punching equipment which results in a rise in the loop position 29 caused by the pulling of the strip by second pinch rolls 33 feeding the strip into the subsequent corrugating equipment.

As described above for the first looping of the strip, this second looping can be operated without regulating the speed of the punching equipment as actuated by variations in the position of the loop control arm. In such case a much larger looping space must be provided so that much larger loops can be accommodated. Nevertheless, the "on" and "off" control switches and actuating means must still be provided. It is preferred, however, that the speed regulating system described above is used.

Figure 7:
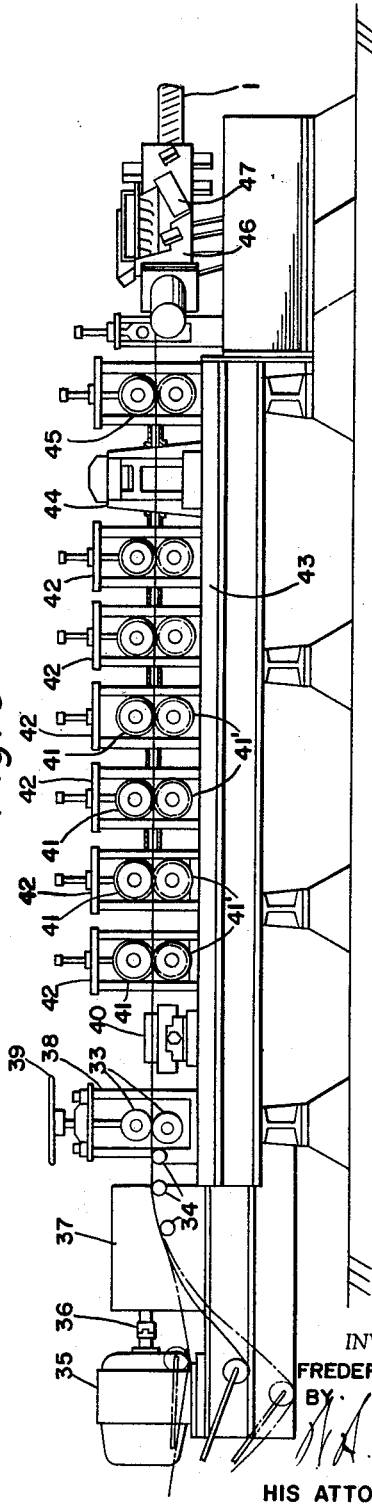
FIG. 7 shows a subsequent section of this system of equipment from the second looping operation through the corrugating equipment, the edge-forming equipment and the spiral-wrapping and lock-seaming equipment.

Operations subsequent to those shown in FIG. 6 are shown in FIG. 7. FIG. 7 is a side elevation view taken at line C—C in FIG. 8. At the left hand side the same second loop is shown as is shown in the right hand side of FIG. 6. The second pinch rolls 33 drive the sheet to the right after it has passed over guide rolls 34. These pinch rolls are driven by motor 35 through drive shaft 36, transmission 37 and drive shaft 38. Pinch rolls 33 are supported and housed in housing 38 and can be adjusted by wheel 39. Feeding guide 40 guides the strip into the series of corrugating or forming rolls 41 and 41'. These corrugating rolls are housed in housing 42 and supported on supporting means 43.

After leaving the corrugating rolls, the strip passes into edge-former 44 which turns one of the linear edges of the strip downward and the other linear edge upward in preliminary shaping for the ultimate lock-seam. Then the corrugated strip with formed edges passes into feeding roll 45 which guides the strip into accurate positioning for entry into spiraling head 46 inside of which is a stationary mandrel over which the corrugated sheet is spirally wrapped between the stationary mandrel and grooved shoes which guide and press the corrugated strip spirally around the mandrel. As the corrugated wrapped sheet rotates around the mandrel, it is held in position by spiralling roll 47 and additional rolls press against the formed edges, as they are brought into interlocking position by the spiralling, and further bend them into a tight lock seam.

The finished pipe then emerges from the exit end of the spiralling head and continues rotating throughout its length as it passes beyond the stationary mandrel. The rotating, travelling finished pipe is supported by a conveyor belt or rollers as desired. While it is considered that conveyors or rollers can be used for the purpose of carrying finished pipe extremely long distances in such cases where the extremely long pipe can be used as such or can be eventually sawed into desired lengths, it is preferred that a travelling saw of types known for similar purposes, can be locked into position on the formed pipe, as it moves forward and turns on its own axis, and the pipe cut into desired lengths. The conveyors or rolls for conveying the pipe and the travelling saw for cutting the pipe are not shown in the drawings.

Figure 8:
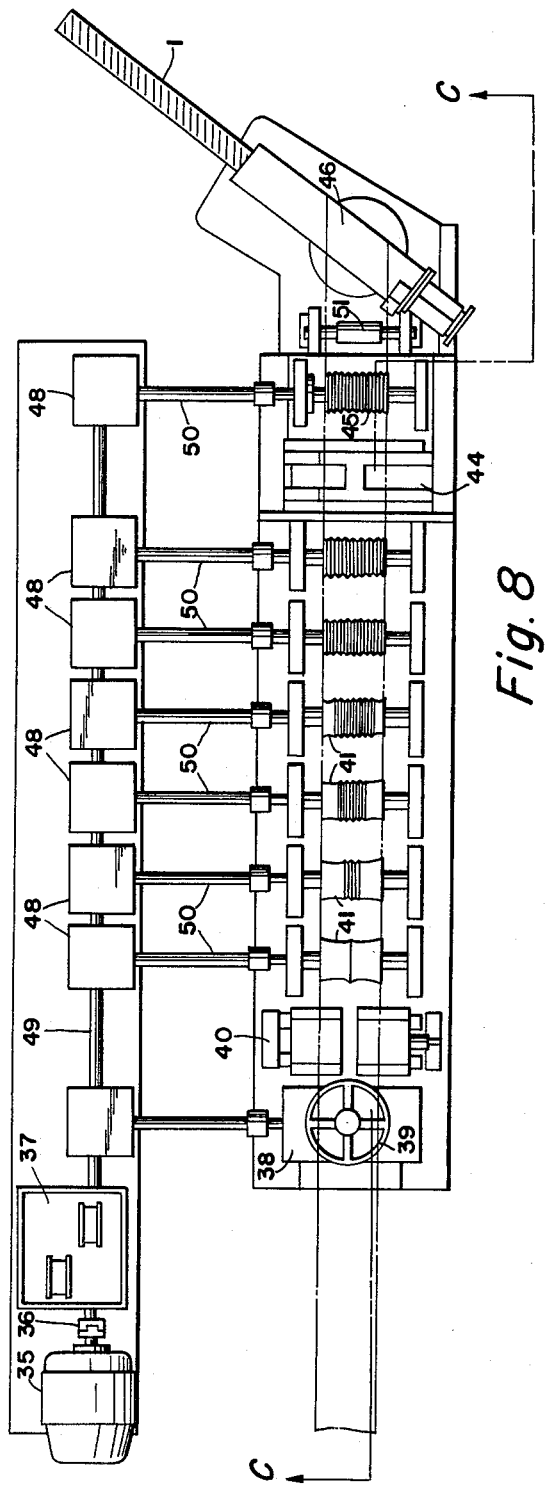
FIG. 8 shows a top view of the equipment shown in FIG. 7.

FIGURE 8 shows a top view of the equipment shown in FIGURE 7 and better illustrates the structure of the corrugating rolls and the procedure in passing the corrugations into the strip. As previously described, the first corrugating roll presses one groove into the strip, the second roll presses an additional groove on each side of this first groove, etc., until the desired number of corrugations or grooves are pressed into the sheet. Because of the small scale used in the drawing, FIGURE 8 does not accurately represent the number of grooves in the fifth and sixth corrugating rolls but each successive set of rolls has an additional pair of ridges so as to produce two corrugations or grooves more than produced by the preceding pair of rolls. FIGURE 8 also better illustrates the arrangement used for driving the various corrugating rolls by means of drive boxes 48 which are driven by line shaft 49 which in turn drive the corrugating rolls through universal drive shafts 50. This view also demonstrates better the angle at which the spiralling head is adjusted to the direction at which the strip proceeds through the corrugating equipment. As previously described, this angle is adjusted according to the diameter of the pipe desired and other controlling factors. This view also shows confining or supporting roll 51 which serves to avoid buckling in the sheet as it passes from guiding roll 45 into the spiralling head.

Figure 9:
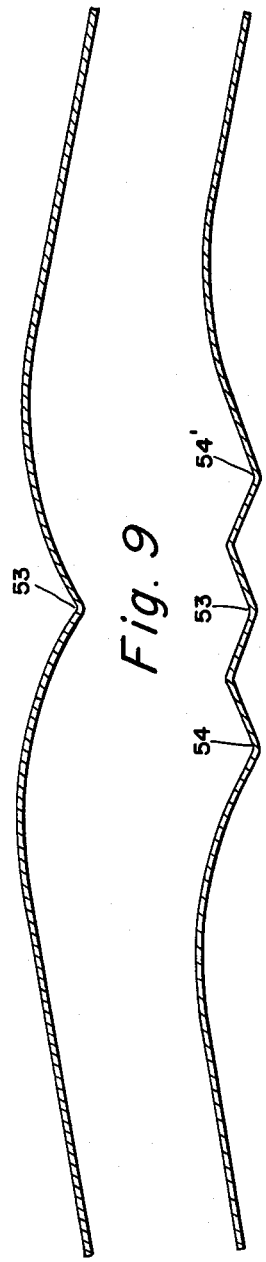

FIG. 9 shows a transverse cross section of the strip after it leaves the first pair of corrugating or forming rolls which press a single groove 53 into the strip.

Figure 10:

FIGURE 10 shows a transverse cross-sectional view of the strip after it leaves the second set of corrugating rolls by which grooves 54 and 54′ have been pressed into the strip on either side of the original groove 53.

FIGURE 11 shows a transverse cross-sectional view of the strip after it leaves the third set of corrugating rolls by which grooves 55 and 55′ have been pressed into the strip.

FIGURE 12 shows a transverse cross-sectional view of the strip after it leaves the fourth set of corrugating rolls by which grooves 56 and 56′ have been pressed into the strip.

FIGURE 13 shows a transverse cross-sectional view of the strip after it leaves the fifth set of corrugating rolls by which grooves 57 and angular shapes 58, 59 and 60 have been pressed into the strip.

FIGURE 14 shows a transverse cross-sectional view of the strip after the sixth set of rolls has given further edge forming shapes for grooves 61′ and 60′.

FIGURE 16 shows a cross-sectional section of the rolls 62 and 63 which effect the edge turning operation to produce the groove 61 shown in FIGURE 14.

FIGURE 17 shows a cross-sectional view of a section of the edge-forming rolls 64 and 65 which produce the groove 60′ shown in FIGURE 15.

It has been found suitable to use various types of sheet metal in the practice of this invention, such as black or uncoated steel, galvanized steel, aluminum sheet, stainless steel sheet, etc. It has been found that the punching operation actually effects a spreading of the galvanized coating to cover the edge or inside area of the holes or perforations and thereby give protection to the metal area forming the holes, which is not the case when perforations or holes are drilled into the strip.

In accordance with the foregoing description, the process of this invention and the system of equipment of this invention has been found particularly suitable for the production of perforated, corrugated, spirally wrapped pipe in which the perforations are surprisingly maintained in straight lines and in the desired positions of the valleys or crests of the corrugations. The process of this invention has been found particularly suitable for the production of pipe in which the speed of the strip through the corrugating equipment is maintained at a speed of about 50–150 feet per minute with a punch press operating at a frequency of 15–30 punches per minute and the strip passing through the punching operation at a speed of approximately 150–200 feet per minute during actual travelling time with the over-all or effective speed of the strip through the first pinch rolls and flattening rolls being preferably at controlled variable speeds but at an effective speed corresponding to that of the strip through the corrugating rolls.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

The invention claimed is:

1. Apparatus for producing perforated, corrugated, spirally-wrapped, lock-seamed pipe comprising:
    (a) a sheet advancing means adapted to advance a long thin level sheet of relatively narrow width at a controlled rate;
    (b) a first looping means arranged to receive said sheet and adapted to loop said sheet when the subsequent flow of said sheet is delayed;
    (c) a punching means arranged to receive said sheet from said first looping means and adapted to stop momentarily the passage of said sheet therethrough, and during said stop to punch a predesigned pattern of perforations therein, thereafter to advance said sheet a prescribed length therethrough, and to repeat said stopping, punching and advancing operations continuously thereafter;
    (d) a second loop control means connected to control the looping of said sheet subsequent to the passage of said sheet through said punching means;
    (e) a driving means arranged to receive said sheet from said second loop control means and adapted to impart to said sheet a constant rate of speed after passage through said punching means;
    (f) corrugating equipment arranged to receive said sheet from said driving means and adapted to produce corrugations in said sheet running parallel to the linear axis of said sheet;
    (g) edge-turning means arranged to receive said sheet from said corrugating equipment and adapted to turn one linear edge of said sheet in an upward direction and the opposite edge of said sheet in a downward direction;
    (h) a spiral-wrapping means arranged to receive said sheet from said edge-turning means comprising a mandrel adapted for adjustment to an appropriate angle with the direction of flow of said sheet, thereby to give a desired diameter to the sheet wrapped spirally thereon, and means for holding said sheet tightly around said mandrel during said spiral-wrapping operation and fitting said turned edges into interlocking relationship;
    (i) a lock-seaming means arranged to receive said sheet from said spiral-wrapping means and adapted to further bend said interlocked linear edges to form a tight seam of said bent edges; and
    (j) a means for advancing finished pipe away from said spiral-wrapping and lock-seaming means.

2. Apparatus of claim 1, in which said sheet advancing means comprises at least one pair of positively driven pinch rolls.

3. Apparatus of claim 2, in which said sheet advancing means also comprises a series of positively driven rolls adapted to remove unevenness in a sheet passed therebetween.

4. Apparatus of claim 1, in which a control means is affixed to said sheet advancing means, said control means being adapted to actuate a stopping device for said advancing means when no sheet is present in said advancing means.

5. Apparatus of claim 1, in which said first looping means comprises a rotatable roller adapted to rest on said sheet, said roller being rotatably attached to one end of a loop control arm, said loop control arm being pivotably connected and supported at the end thereof opposite to the end attached to said roller, said loop control arm having attached thereto an actuating device adapted to actuate a first control means when said roller is positioned in a prescribed low position and to actuate a second control means when said roller is positioned in a prescribed high position.

6. Apparatus of claim 5, in which said actuating device is also adapted to regulate the speed of said advancing means in accordance with various prescribed positions occupied by said roller.

7. Apparatus of claim 1, in which said punching means comprises an automatic punch press having an inlet driving means and an outlet driving means for said sheet passing therethrough, said inlet driving means and said outlet driving means each comprising a pair of positively driven rolls between which said sheet is passed, at least one of which rolls having an actuating device connected thereto and adapted to stop said rolls and to actuate said punch press when a prescribed length of said sheet has passed therethrough.

8. Apparatus of claim 1, in which said second loop control means comprises a rotatable roller adapted to rest on said sheet, said roller being rotatably attached to one end of a loop control arm, said loop control arm being pivotably connected and supported at the end thereof opposite to the end attached to said roller, said loop control arm having attached thereto an actuating device adapted to actuate a first control means when said roller is positioned in a prescribed low position and to actuate a second control means when said roller is positioned in a prescribed high position.

9. Apparatus of claim 8, in which said actuating device is also adapted to regulate the speed of said advancing means in accordance with various prescribed positions occupied by said roller.

10. Apparatus for producing perforated, corrugated, spirally-wrapped, lock-seamed pipe comprising:
(a) a sheet advancing means comprising at least one pair of positively driven pinch rolls and a series of positively driven rolls adapted to remove unevenness in a sheet passed therebetween;
(b) a control means attached to said sheet advancing means and adapted to actuate a stopping device for said advancing means when no sheet is present in said advancing means;
(c) a first looping means arranged to receive said sheet from said sheet advancing means comprising a rotatable roller adapted to rest on said sheet, said roller being rotatably attached to one end of a loop control arm, said loop control arm being pivotably connected and supported at the end thereof opposite to the end attached to said roller, said loop control arm having attached thereto an actuating device adapted to actuate a first control means when said roller is positioned in a prescribed low position and to actuate a second control means when said roller is positioned in a prescribed high position and said control means being connected to control the advance means to regulate the speed of said sheet in accordance with the positioning of roller in various positions between said prescribed low position and said prescribed high position;
(d) a punching means arranged to receive the sheet from the first looping means, to stop momentarily the passage of said sheet therethrough, and during said stop to punch a predesigned pattern of perforations therein, thereafter to advance said sheet a prescribed length therethrough, and to repeat said stopping, punching and advancing operations continuously thereafter, said punching means comprising an automatic punch press having an inlet driving means and an outlet driving means for said sheet passing therethrough, said inlet driving means and said outlet driving means each comprising a pair of positively driven rolls between which said sheet is passed, at least one of said rolls having an actuating device connected thereto and adapted to stop said rolls and to actuate said punch press when a prescribed length of said sheet has passed therethrough;
(e) a second loop control means arranged to receive the sheet from said punching means and to control the looping of said sheet subsequent to the passage of said sheet through said punching means, said second loop control means comprising a rotatable roller adapted to rest on said sheet, said roller being rotatably attached to one end of a loop control arm, said loop control arm being pivotably connected and supported at the end thereof opposite to the end attached to said roller, said loop control arm having attached thereto an actuating device adapted to actuate a first control means when said roller is positioned in a prescribed low position and to actuate a second control means when said roller is positioned in a prescribed high position, and said control means being adapted to regulate the speed of said sheet in accordance with the positioning of roller in various positions between said prescribed low position and said prescribed high position;
(f) a driving means arranged to receive said sheet from said second loop control means and adapted to impart to said sheet a constant rate of speed after passage through said punching means;
(g) edge-turning means arranged to receive said sheet from said driving means and adapted to turn one linear edge of said sheet in an upward direction and the opposite edge of said sheet in a downward direction;
(h) a spiral-wrapping means arranged to receive said sheet from said edge-turning means and comprising a mandrel adapted for adjustment to an appropriate angle with the direction of flow of said sheet, thereby to give a desired diameter to the sheet wrapped spirally thereon, and means for holding said sheet tightly around said mandrel during said spiral-wrapping operation and fitting said turned edges into interlocking relationship;
(i) a lock-seaming means arranged to receive said sheet from said spiral-wrapping means and adapted to further bend said interlocked linear edges and thereby form a tight seam of said bent edges; and
(j) a means for advancing finished pipe away from said spiral-wrapping and lock-seaming means.

References Cited by the Examiner

UNITED STATES PATENTS

| | | | |
|---|---|---|---|
| 2,136,943 | 11/38 | Freeze | 113—35 |
| 2,710,565 | 6/55 | Schroeder | 83—236 |
| 2,714,864 | 8/55 | Fay | 113—35 |
| 2,729,180 | 1/56 | Freeze | 113—35 |
| 2,991,740 | 7/61 | Eckhardt | 113—35 |
| 3,017,796 | 1/62 | Aner et al. | 83—263 |

FOREIGN PATENTS 444,640  8/12  France.

CHARLES W. LANHAM, *Primary Examiner.*

NEDWIN BERGER, *Examiner.*